J. P. BALDWIN.
AUTOMATIC WEIGHING APPARATUS FOR LIQUIDS.
APPLICATION FILED MAR. 8, 1909.

924,220.

Patented June 8, 1909.
2 SHEETS—SHEET 1.

UNITED STATES PATENT OFFICE.

JOHN P. BALDWIN, OF BEREA, OHIO.

AUTOMATIC WEIGHING APPARATUS FOR LIQUIDS.

No. 924,220.　　　　Specification of Letters Patent.　　　　Patented June 8, 1909.

Application filed March 8, 1909. Serial No. 481,965.

*To all whom it may concern:*

Be it known that I, JOHN P. BALDWIN, a citizen of the United States, residing at Berea, in the county of Cuyahoga and State of Ohio, have invented a certain new and useful Improvement in Automatic Weighing Apparatus for Liquids, of which the following is a full, clear, and exact description.

The present invention is directed to automatic liquid weighers and is more particularly an improvement upon the liquid weighers forming the subject of my prior Patents No. 446,844 of February 24, 1891 and No. 479,694 of July 26, 1892.

The objects of the invention are to provide means whereby the mechanism shall be sufficiently sensitive to substantially eliminate the error of overloading common in other machines because of their inertia.

It has further been my object to achieve this sensitiveness and a consequent celerity of action by means which shall be equally effective with both rapid and slow flowing streams.

A further object has been to provide a structure of inlet conduit which shall be clean cut in action so as to attain a minimum of error and shall be structurally of such form as to maintain its proper position throughout the life of the apparatus.

A still further object has been to provide a novel method of mounting the weighing container so that its bearings and the lubricant therefor shall not be subject to deterioration under the action of liquids splashed from the container.

Figure 1:
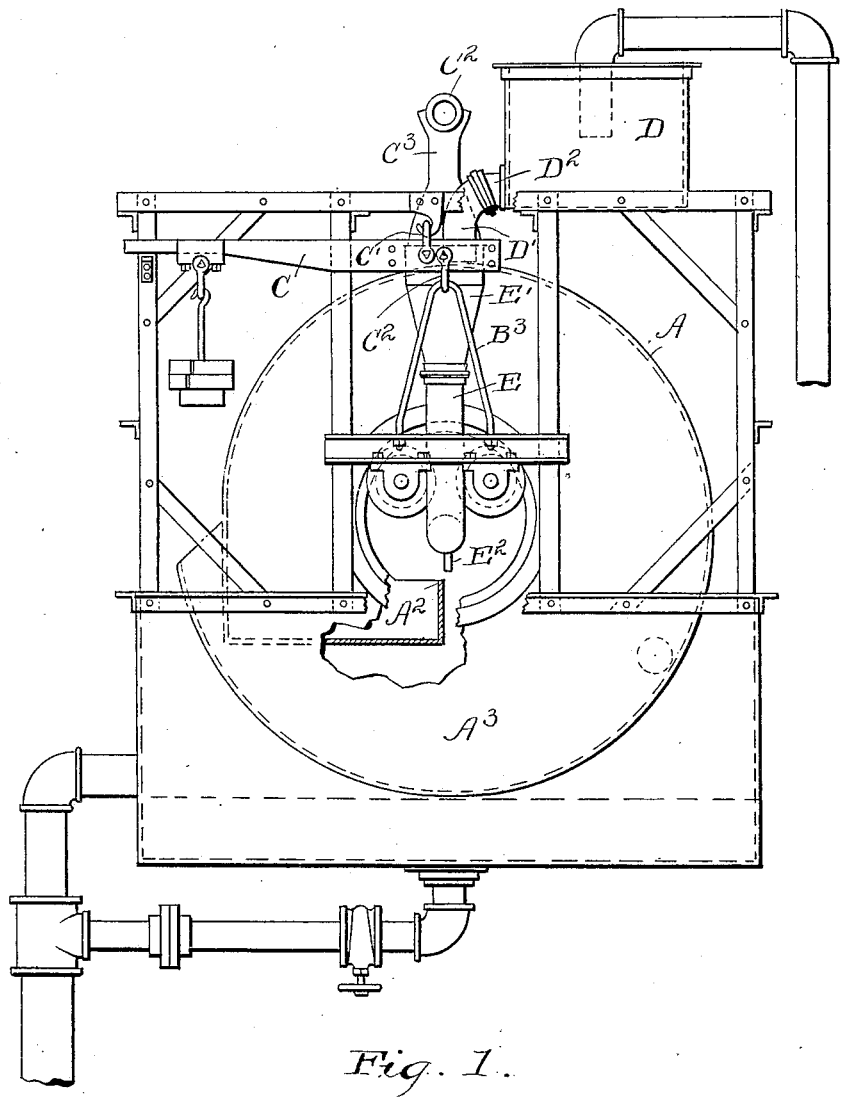
Figure 2:
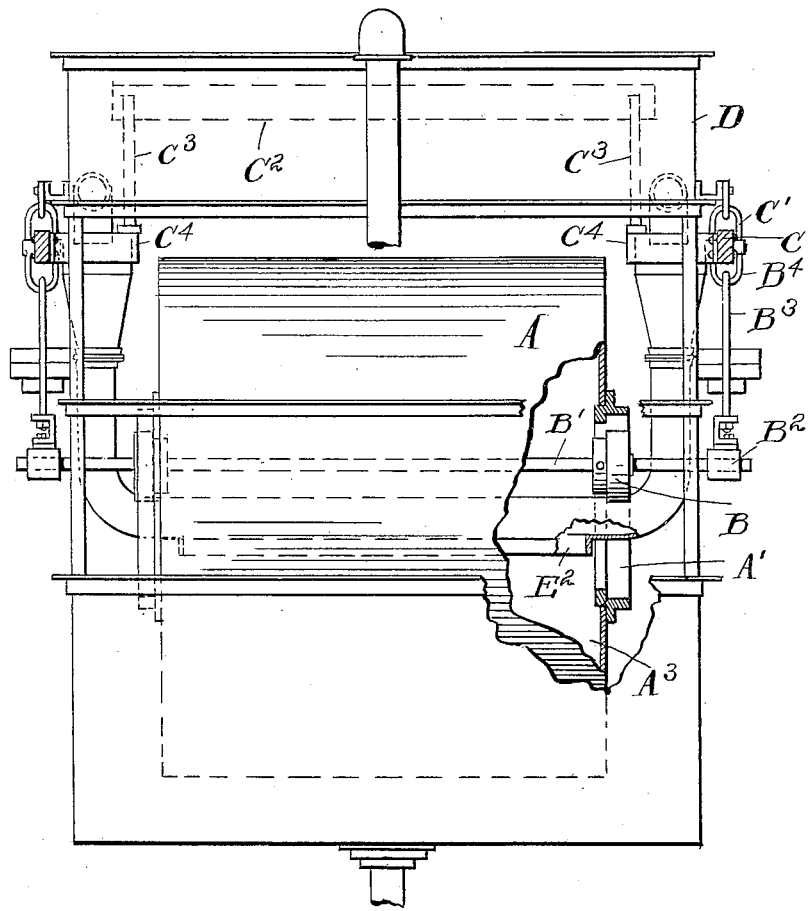

The above and other desirable objects it will be seen are attained by that embodiment of my invention illustrated in the accompanying drawings, in which:

Figure 1 is an end elevation partly broken away of a weighing apparatus constructed in accordance with my inventive idea. Fig. 2 is an elevation of the same partly broken away, looking from the right hand as the apparatus appears in Fig. 1.

The weighing container A is of the volute scroll type. The ends of the container are open and have extending therefrom flanged members A' constituting a circular trackway by which the scroll rotates on a pair of wheels or rollers B, B at each end, said rollers being fixed to shafts B', B' extended to a considerable distance beyond the rollers and journaled in bearings $B^2$ at such a distance from the open end of the scroll that the liquid splashed through said open end will not reach the bearings to any such extent as to injure them or the lubricant therefor. The said bearings are themselves suspended by a suitable rod $B^3$ from a link $B^4$ hung on a knife edge of a scale beam C which in turn is properly suspended by a link C' from the frame. It will be noted that I provide a scale beam at each end of the frame, and have connected the two beams by means of a torsion rod or tube $C^2$ so that they shall operate as one scale. This torsion rod is fixed to a pair of upright members $C^3$ which are in turn fixed to the inner face of the two scale beams by means of a stirrup $C^4$ or other suitable connection.

The liquid is fed to the weighing apparatus preferably from a reservoir D which may be slidably mounted along the frame, for the purpose hereinafter described, the liquid being fed from this reservoir through a delivery nozzle D' as shown. I prefer that this delivery nozzle should be connected to the reservoir by means of an adjustable union $D^2$ by which the line of fall of the liquid from the nozzle may be shifted back and forth for reasons to be pointed out below. It is ordinarily not necessary to make the reservoir adjustable along the frame if the adjustable union is used, since the adjustability of each is designed for accomplishing the same purpose.

Fixed to the scale beam by any suitable means is the receiving pipe E for the weighing container, which receiving pipe has a wide mouth E' into which the discharge from the delivery nozzle of the reservoir flows. The said receiving pipe has a double mouth, one at each end of the weighing container, there being a duplicate discharge nozzle at each end of the reservoir. The receiving pipe extends through the weighing container from one end to the other and has a discharge orifice in the shape of a long narrow mouth $E^2$ extending substantially the length of the reservoir and very close to the edge $A^2$ of the inner end of the scroll.

In operation the empty container is properly balanced on the scale beams and the additional weights added to counterbalance the desired load. The liquid is then admitted from the reservoir through the discharge nozzle into the large funnel mouth of the receiving pipe fixed to the scale beam, and flows from the narrow mouth of said pipe into the large outer containing portion A³ of the scroll. When the amount of liquid in this portion of the scroll compensates for the extra weights added to the scale beam, the scale beam will tip and the receiving pipe E rigid therewith will be inclined. The narrow discharge mouth of this receiving pipe is so located with regard to the inner edge A² of the scroll that the inclination due to this tilting will be sufficient to cause the said mouth to swing over the said inner edge and discharge liquid into that section, it being borne in mind that the scroll itself and the supports by which it is swung will drop in a vertical line upon the tipping of the scale beam, since they are pivotally connected with the latter. The further discharge of the liquid into the inner section of the scroll will, as is well-known in this type of container, overbalance that side of the scroll and cause rotation of the same in such a manner as to discharge the liquid contained in the outer section. Such revolution will continue after the discharge of the liquid and after the scale beam has arisen to its original level. This operation is well understood and need not be recited in detail.

I have discovered that a large part of the error in prior machines has been due to the fact that after that movement takes place, which is designed to transfer the flow of liquid from the outer section of the scroll to the inner section, a considerable time will elapse before the flow will be cut off from the outer section entirely. With the construction which I have designed, however, it will be observed that owing to the fact of the receiving funnel and pipe being fixed to the scale beam on the same side of the fulcrum from which the container is suspended, the continued discharge of liquid thereinto on the wall thereof on this side of the fulcrum will, after the weight has reached the point necessary for tilting the scale beam, increase the rapidity of such tilting action simply by the stress of the flow alone. Thus the flow will be cut off from the outer section of the scroll and transferred to the inner section of the scroll with a rapid movement after the tilting weight has once begun. It is to be observed that this effect is had equally well with small or large flows of moving liquids, since, if the flow through the receiving pipe into the container be very rapid so that the possible error might be large, so also will the stress or blow of the falling stream of liquid against the wall of the receiving funnel be greater and the movement correspondingly accelerated.

The sensitiveness of the scale beam to the force of the falling stream may be accentuated by shifting the reservoir or adjusting the discharge nozzle back away from the fulcrum of the scale beam. Such a movement of the point of discharge of the liquid from the reservoir will obviously cause the falling stream to strike the wall of the receiving funnel at a point still farther away from the fulcrum of the scale beam and increase the effect of the blow, thus rendering the apparatus more sensitive and quickly operative when the desired load is in the weighing container.

It will be noted that the receiving pipe E for the weighing container is rigid with the scale beam at each end, the two ends being connected together by a continuous pipe extending, as above stated, through the entire length of the container. This insures that the discharge mouth of the pipe shall always be in the position in which it is placed when the apparatus is first installed, and will not be subject to such accidental bending or dislocation as is common with those receiving pipes which enter the weighing container at one point only and are sustained at but one end.

It will be noted that although the trackway is fixed directly to each end of the container and consequently strong and rigid therewith, nevertheless the bearings for the rotating parts are themselves removed to quite a distance away from the end of the tank so that such liquid as is splashed from the open end will not reach the bearings. This is a decided advantage since such liquid is frequently acid in character and is detrimental to both the lubricant and the bearings. The arrangement which I have designed for achieving this protection of the bearings is sufficiently strong to support the apparatus, if indeed it be not stronger and more permanent than the structure in my prior patents.

It will be seen that the machine above described attains the objects of invention sought and further embodies other numerous advantages of construction.

Having thus described my invention, I claim:

1. In automatic liquid weighing apparatus the combination with a rotatable weighing container of the volute type, of a scale beam, a receiving conduit leading into the container fixed to the scale beam with at least one wall thereof on the same side of the scale beam fulcrum from which the container is suspended.

2. Automatic liquid weighing apparatus comprising a rotatable container of the volute type, a scale beam from which said container is suspended, a receiving pipe leading into the container and fixed to the scale beam, said pipe having a wall on the same side of the beam fulcrum as that from which the container is suspended, and means for varying the line of fall of the liquid into the receiving pipe.

3. Automatic liquid weighing apparatus comprising a rotatable container of the volute type, a scale beam from which said container is suspended, a receiving pipe leading into the container and fixed to the scale beam, said pipe having a wall on the same side of the beam fulcrum as that from which the container is suspended, and means for varying the line of fall of the liquid into the receiving pipe, said last named means comprising a nozzle adjustable toward and from said fulcrum point.

4. Automatic weighing apparatus comprising a rotatable container of the volute type, a pair of scale beams from which said container is suspended, a delivery pipe having two receiving mouths, one rigidly fixed to each scale beam and the two leading to a common horizontal pipe extending through the central portion of the container.

5. Automatic weighing apparatus comprising a rotatable container of the volute type, a pair of scale beams from which said container is suspended, a delivery pipe having two receiving mouths, one rigidly fixed to each scale beam and the two leading to a common horizontal pipe extending through the central portion of the container, said horizontal pipe being provided with a long narrow mouth extending substantially the length of the container.

6. Automatic weighing apparatus comprising a pair of scale beams and a container of the volute variety suspended from said scale beam by pivoted connecting means, said pivoted means carrying shaft bearings at a considerable distance from each end of the container and shafts in said bearings extending the length of the container, wheels on said shafts and fixed thereto to rotate therewith, and tracks at each end of the container resting on said wheels and adapted to roll thereover.

In testimony whereof, I hereunto affix my signature in the presence of two witnesses.

JOHN P. BALDWIN.

Witnesses:
H. R. SULLIVAN,
J. M. WOODWARD.